US007680793B2

(12) United States Patent
Wong et al.

(10) Patent No.: US 7,680,793 B2
(45) Date of Patent: Mar. 16, 2010

(54) COMMIT-TIME ORDERED MESSAGE QUEUE SUPPORTING ARBITRARY READ AND DEQUEUE PATTERNS FROM MULTIPLE SUBSCRIBERS

(75) Inventors: Lik Wong, Union City, CA (US); Hung Tran, Sunnyvale, CA (US); James W. Stamos, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 300 days.

(21) Appl. No.: 11/245,863

(22) Filed: Oct. 7, 2005

(65) Prior Publication Data

US 2007/0083569 A1    Apr. 12, 2007

(51) Int. Cl.
G06F 17/30    (2006.01)
(52) U.S. Cl. .................... 707/8; 707/10; 707/7
(58) Field of Classification Search ............ None
See application file for complete search history.

(56) References Cited

U.S. PATENT DOCUMENTS

| 4,007,450 | A |   | 2/1977  | Haibt et al.        |        |
|-----------|---|---|---------|---------------------|--------|
| 4,318,182 | A |   | 3/1982  | Bachman et al.      |        |
| 5,113,522 | A |   | 5/1992  | Dinwiddie et al.    |        |
| 5,347,632 | A |   | 9/1994  | Filepp et al.       |        |
| 5,465,328 | A |   | 11/1995 | Dievendorff et al.  |        |
| 5,473,696 | A |   | 12/1995 | van Breemen et al.  |        |
| 5,504,899 | A | * | 4/1996  | Raz ...............  | 707/10 |
| 5,604,900 | A |   | 2/1997  | Iwamoto et al.      |        |
| 5,627,764 | A |   | 5/1997  | Schutzman et al.    |        |
| 5,652,888 | A |   | 7/1997  | Burgess             |        |
| 5,680,619 | A |   | 10/1997 | Gudmundson et al.   |        |
| 5,701,480 | A | * | 12/1997 | Raz ...............  | 718/101|
| 5,715,413 | A |   | 2/1998  | Ishai et al.        |        |

(Continued)

FOREIGN PATENT DOCUMENTS

EP    0 992 909 A2    4/2000

(Continued)

OTHER PUBLICATIONS

Lomet, Jan. 1993, IEEE, Proceedings of the 2$^{nd}$ International Conference on Parallel and Distributed Information Systems, pp. 48-55, http://ieeexplore.ieee.org/xpls/abs_all.jsp?arnumber=253073.*

(Continued)

*Primary Examiner*—Yicun Wu
(74) *Attorney, Agent, or Firm*—Hickman Palermo Truong & Becker LLP

(57) ABSTRACT

Data consistency in the context of information sharing requires maintenance of dependencies among information being shared. Transactional dependency ordering is implemented in a database system message queue, by associating a unique system commit time with each transactional message group. Read consistency is implemented in such a queue by allowing only messages with a fully determined order to be visible. A fully determined order is implemented through use of a high watermark, which guarantees that future transactions, for which messages are entering the queue, have commit times that are greater than the current high watermark. Therefore, only messages below the current high watermark are visible and can be dequeued, with no chance of other new messages enqueuing below the current high watermark.

24 Claims, 6 Drawing Sheets

U.S. PATENT DOCUMENTS

| | | | |
|---|---|---|---|
| 5,758,083 A | 5/1998 | Singh et al. | |
| 5,802,253 A | 9/1998 | Gross et al. | |
| 5,806,076 A * | 9/1998 | Ngai et al. | 707/203 |
| 5,828,835 A | 10/1998 | Isfeld et al. | |
| 5,870,562 A | 2/1999 | Butman et al. | |
| 5,878,056 A | 3/1999 | Black et al. | |
| 5,884,035 A | 3/1999 | Butman et al. | |
| 5,890,167 A | 3/1999 | Bridge, Jr. et al. | |
| 5,940,839 A | 8/1999 | Chen et al. | |
| 5,948,062 A | 9/1999 | Tzelnic et al. | |
| 6,026,430 A | 2/2000 | Butman et al. | |
| 6,058,389 A | 5/2000 | Chandra et al. | |
| 6,163,813 A | 12/2000 | Jenney | |
| 6,169,988 B1 | 1/2001 | Asakura | |
| 6,182,086 B1 | 1/2001 | Lomet et al. | |
| 6,188,699 B1 | 2/2001 | Lang et al. | |
| 6,222,840 B1 | 4/2001 | Walker et al. | |
| 6,272,500 B1 | 8/2001 | Sugita | |
| 6,295,541 B1 | 9/2001 | Bodnar et al. | |
| 6,330,686 B1 | 12/2001 | Denny et al. | |
| 6,334,114 B1 | 12/2001 | Jacobs et al. | |
| 6,338,074 B1 | 1/2002 | Poindexter et al. | |
| 6,393,423 B1 | 5/2002 | Goedken | |
| 6,405,209 B2 | 6/2002 | Obendorf | |
| 6,442,568 B1 | 8/2002 | Velasco et al. | |
| 6,453,354 B1 | 9/2002 | Jiang et al. | |
| 6,473,794 B1 | 10/2002 | Guheen et al. | |
| 6,493,826 B1 | 12/2002 | Schofield et al. | |
| 6,515,968 B1 | 2/2003 | Combar et al. | |
| 6,519,571 B1 | 2/2003 | Guheen et al. | |
| 6,529,932 B1 | 3/2003 | Dadiomov et al. | |
| 6,536,037 B1 | 3/2003 | Guheen et al. | |
| 6,553,428 B1 | 4/2003 | Ruehle et al. | |
| 6,654,907 B2 | 11/2003 | Stanfill et al. | |
| 6,658,596 B1 | 12/2003 | Owen | |
| 6,691,155 B2 | 2/2004 | Gottfried | |
| 6,804,672 B1 * | 10/2004 | Klein et al. | 707/8 |
| 6,826,182 B1 | 11/2004 | Parthasarathy | |
| 6,874,104 B1 * | 3/2005 | Josten et al. | 714/15 |
| 6,892,210 B1 | 5/2005 | Erickson et al. | |
| 7,010,529 B2 * | 3/2006 | Klein et al. | 707/8 |
| 7,035,852 B2 * | 4/2006 | Hopewell et al. | 707/8 |
| 7,124,110 B1 * | 10/2006 | Kemp et al. | 705/37 |
| 7,266,764 B1 | 9/2007 | Flam | |
| 7,392,265 B2 * | 6/2008 | Kraft et al. | 707/200 |
| 2001/0047270 A1 | 11/2001 | Gusick et al. | |
| 2002/0073139 A1 | 6/2002 | Hawkins et al. | |
| 2002/0112008 A1 | 8/2002 | Christenson et al. | |
| 2002/0138582 A1 | 9/2002 | Chandra et al. | |
| 2003/0110085 A1 | 6/2003 | Murren et al. | |
| 2003/0115274 A1 | 6/2003 | Weber | |
| 2003/0115276 A1 * | 6/2003 | Flaherty et al. | 709/206 |
| 2003/0177187 A1 | 9/2003 | Levine et al. | |
| 2003/0182328 A1 | 9/2003 | Paquette et al. | |
| 2003/0198214 A1 | 10/2003 | Tsukakoshi | |
| 2003/0212657 A1 | 11/2003 | Kaluskar et al. | |
| 2003/0212670 A1 | 11/2003 | Yalamanchi et al. | |
| 2003/0236823 A1 | 12/2003 | Patzer et al. | |
| 2003/0236834 A1 | 12/2003 | Gottfried | |
| 2004/0024771 A1 | 2/2004 | Jain et al. | |
| 2004/0024774 A1 | 2/2004 | Jain et al. | |
| 2004/0024794 A1 | 2/2004 | Jain et al. | |
| 2004/0034640 A1 | 2/2004 | Jain et al. | |
| 2004/0034664 A1 | 2/2004 | Jain et al. | |
| 2004/0107125 A1 | 6/2004 | Guheen et al. | |

FOREIGN PATENT DOCUMENTS

| | | |
|---|---|---|
| JP | 2000-132443 | 5/2000 |
| JP | 2002-049517 | 2/2002 |
| WO | WO 02/05116 A2 | 1/2002 |
| WO | WO 02/097676 A2 | 12/2002 |

OTHER PUBLICATIONS

International Searching Authority, "Notification of Transmittal of the International Search Report or the Declaration," dated May 25, 2004, 6 pages.

IBM, "IBM® DB2® Universal Database, Replication Guide and Reference, *Version 7*," SC26-9920-00, 1994, 2000, Chapters 1, 4, and 6, 69 pages.

Kurakawa, Kei et al., "Life Cycle Design Support Based on Environmental Information Sharing," IEEE, Feb 1-3, 1999, Proceedings EcoDesign '99, First International Symposium, pp. 138-142.

Gunther, Oliver, et al., "MMM: A Web-Based System for Sharing Statistical Computing Modules," IEEE, May-Jun. 1997, vol. 1, Issue 3, pp. 59-68.

Jui, Toliver, "Streams Advanced Queuing: Overview and Tutorial," An Oracle White Paper, Jun. 2005, 9 pages.

Jui, Toliver, "Using Oracle Streams Advanced Queueing: Best Practices," An Oracle White Paper, Jun. 2004, 5 pages.

McElroy, Patricia, et al., "Sharing Information with Oracle Streams," An Oracle White Paper, May 2005, 12 pages.

Shiva, S.G., et al., "Modular Description/Simulation/Synthesis Using DDL," 19th Design Automation Conference 1982, IEEE Press, pp. 321-329.

Spiegler, Israel, "Automating Database Construction," ACM SIGMIS Database, vol. 14, Issue 3, Spring 1983, pp. 21-29.

Sybase, "Sybase Replication Server, (v 12.0) Administration Guide," May 2002, Chapter 10, *Managing Subscriptions*, pp. 309-260.

International Searching Authority, "Notification of Transmittal of the International Search Report and the Written Opinion of the International Searching Authority, or the Declaration," dated Dec. 3, 2004, 12 pages.

Office Action from CN for foreign patent application No. 03821299.4 dated Dec. 24, 2007.

Notification of Office action(s) in U.S. Appl. No. 10/308,879, mailed on Jun. 24, 2008 and Sep. 02, 2008.

* cited by examiner

COMMIT-TIME ORDERED MESSAGE QUEUE SUPPORTING ARBITRARY READ AND DEQUEUE PATTERNS FROM MULTIPLE SUBSCRIBERS

CROSS REFERENCE TO RELATED APPLICATIONS

This application is related to the following, the contents of all of which are incorporated by this reference in their entirety for all purposes as if fully disclosed herein:

U.S. Pat. No. 6,058,389 entitled "APPARATUS AND METHOD FOR MESSAGE QUEUING IN A DATABASE SYSTEM";

U.S. Pat. No. 6,889,231 entitled "ASYNCHRONOUS INFORMATION SHARING SYSTEM";

U.S. patent application Ser. No. 10/308,879 filed on Dec. 2, 2002, entitled "IN MEMORY STREAMING WITH DISK BACKUP AND RECOVERY OF MESSAGES CAPTURED FROM A DATABASE REDO STREAM";

U.S. patent application Ser. No. 10/308,851 filed on Dec. 2, 2002, now U.S. Pat. No. 7,031,974 issued Apr. 18, 1006, entitled "REPLICATING DDL CHANGES USING STREAMS";

U.S. patent application Ser. No. 10/400,225 filed on Mar. 26, 2003, now U.S. Pat. No. 7,103,612, issued Sep. 5, 2006, entitled "INSTANTIATION OF OBJECTS FOR INFORMATION-SHARING RELATIONSHIPS"; and U.S. patent application Ser. No. 10/443,206 filed on May 21, 2003, now U.S. Pat. No. 7,181,482, issued Feb. 20. 2007, entitled "BUFFERED MESSAGE QUEUE ARCHITECTURE FOR DATABASE MANAGEMENT SYSTEMS".

FIELD OF THE INVENTION

The present invention relates generally to information sharing within a database system and, more specifically, to a commit-time ordered message queue that supports multiple subscribers and arbitrary browse and dequeue patterns.

BACKGROUND

Information sharing is becoming more important as businesses grow and become more global. Not only must companies share information within the company, but also with customers and partners. Information is bound to become more widely dispersed and shared as companies migrate to a grid computing model. Grids are dynamic in nature, which requires that information can be easily and quickly moved from a source to a destination system that will perform the computing.

In the context of an information sharing system, a queue is a structure that holds messages and provides access and ordering functionality. Because the primary usage of such a queue is for messaging, the queue is at times referred to herein as a message queue. A "queue table" is the table where data for a queue is stored. "Dequeue sort order" is a property of a queue table that specifies the ordering of messages.

When Web-based business and other applications communicate with each other, producer applications enqueue messages and consumer applications dequeue messages. At the most basic level of queuing, one producer enqueues one or more messages into one queue, where each message is dequeued and processed once by one of the consumers. A message stays in the queue until a consumer dequeues it or the message expires. A producer may stipulate a delay before the message is available to be consumed, and a time after which the message expires. Likewise, a consumer may wait when trying to dequeue a message if no message is available. An agent program or application may act as both a producer and a consumer. Producers can enqueue messages in any sequence. Messages are not necessarily dequeued in the order in which they are enqueued. Messages can be enqueued without being dequeued.

At a slightly higher level of complexity, many producers enqueue messages into a queue, all of which are processed by one consumer. Or many producers enqueue messages, each message being processed by a different consumer depending on type and correlation identifier.

A system, such as a database system, can form messages by mining transaction logs or data in a database. A system may also form messages when events are fired. Heterogeneous systems may share information by enqueuing messages into a queue using APIs or a messaging gateway. Users of a message queue can dequeue messages manually for processing by a client application.

For example, a point-of-sales system sharing information with a reporting database in real-time is a scenario in which concurrent message capture may occur. A store may have multiple point-of-sale terminals acting as clients of the store inventory database and sending order processing information to the store database. Corporate headquarters may have a system configured for handling near real-time reports using data streaming from the stores. This system may even be a grid if the corporation desires a dynamic system that sizes based on load. The store database can provide near real-time data by forming messages based on triggers fired when the terminals process sales. Thus, message queues can be integral components of a database information sharing system.

A database system that adheres to the ACID (Atomicity, Consistency, Isolation, Durability) model provides functionality for grouping operations in transactions that are atomic. Changes to data via a transaction are not visible to other transactions until the system has atomically committed the changes. If a transaction reads or modifies data written by a previously committed transaction then the transaction is said to have a data dependency on the prior transaction. Furthermore, transactional-level locks may also introduce transactional dependencies. Messages are often used to implement database transactions and, therefore, such messages may have transactional dependencies. For example, message X has a dependency on message Y if part of message X's data is derived directly or indirectly from message Y's data.

One approach to a message queue provides read ordering based at least in part on the enqueue-time of messages. Read order is the order in which messages are presented for browse and dequeue operations. This approach does not support data-dependency ordering because there is no way to read messages from the queue based on transactional dependencies. Users would have to build custom enqueue code that tagged messages with extra metadata, which is used by custom logic in the dequeuing application to enforce transactional ordering. Depending on the requirements of the application and the potential workload, this custom code can be non-trivial or infeasible to implement.

FIG. 1 is a block diagram that illustrates a data dependency violation in the context of a message queue, where messages are dequeued independent of transactional dependency ordering. This example shows that data dependency ordering may be violated with enqueue-time ordering. The arrow from transaction T2 to transaction T1 shows that T1 has a dependency on T2, because T1 is dependent on the value written to table TAB2 by T2.

FIG. 1 shows messages with data dependencies being shared between a source and destination database. At the source database, two sessions are enqueuing messages in the following sequence:

Session 1 enqueues message M1 as part of transaction T1. For example, message M1 contains an insert of a row into an 'hr.departments' table;

Session 2 enqueues message M2 as part of transaction T2. For example, message M2 contains an insert of a row into the 'hr.employees' table for the employee with an employee_id of 207; and Session 1 enqueues message M3 as part of transaction T1. For example, message M3 contains an update to a row in the 'hr.employees' table for the employee with an employee_id of 207.

Session 3 dequeues messages from the source database to the destination database. The messages are dequeued in the following order:

Message M1 is dequeued, and the change is applied successfully.

Message M3 is dequeued, and an error results because no data is found for an employee with an employee_id of 207.

Message M2 is dequeued, and the change is applied. The result is that incorrect information is in the 'hr.employees' table for the employee with an employee_id of 207.

The correct dequeue order that obeys data dependencies and transaction grouping is (M2, M1, M3). Instead, enqueue-time ordering results in dequeue order (M1, M3, M2) because T1 was the first transaction to enqueue a message. An apply error results when message M3 is applied since the update depends on data that is populated by M2. Thus, after all messages have been applied, the state of TAB2 at the destination is not consistent with the state of TAB2 at the source.

Additionally, the message ordering approach based on enqueue-time does not provide repeatable reads. A queue supports repeatable reads if messages are always seen in the same order for any set of reads.

FIG. 2 is a block diagram that illustrates a non-repeatable read in the context of a message queue, where a set of read operations (i.e., "browse" operations) performed twice without any intervening dequeues may result in two different sets of messages. This example shows that a client performing multiple browse operations is not guaranteed a well-defined read order. If the client operation is dependent on a deterministic ordering, then the client operation may fail.

FIG. 2 shows messages being enqueued and browsed within a database. Two sessions are enqueuing messages in the following sequence:

Session 1 enqueues message m1 as part of transaction T1.
Session 2 enqueues message m2 as part of transaction T2.
Session 1 enqueues message m3 as part of transaction T1.
Session 2 commits transaction T2.
Session 1 commits transaction T1.

Session 3 browses messages in the queue at two different times. The first time session 3 browses messages, session 2 has committed, but session 1 has not yet committed. For this browse, the browse set shows messages in the order (m2, m1, m3). The second time session 3 browses messages, both session 1 and session 2 have committed. For this browse, the browse set shows messages in the order (m1, m3, m2). This could be a problem, for example, if the client application performs a set of browse operations to set up program state and then performs a set of dequeues which results in a different result set.

Based on the foregoing, this approach is not ideal for systems with concurrent enqueuing of dependent messages.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

Figure 1:
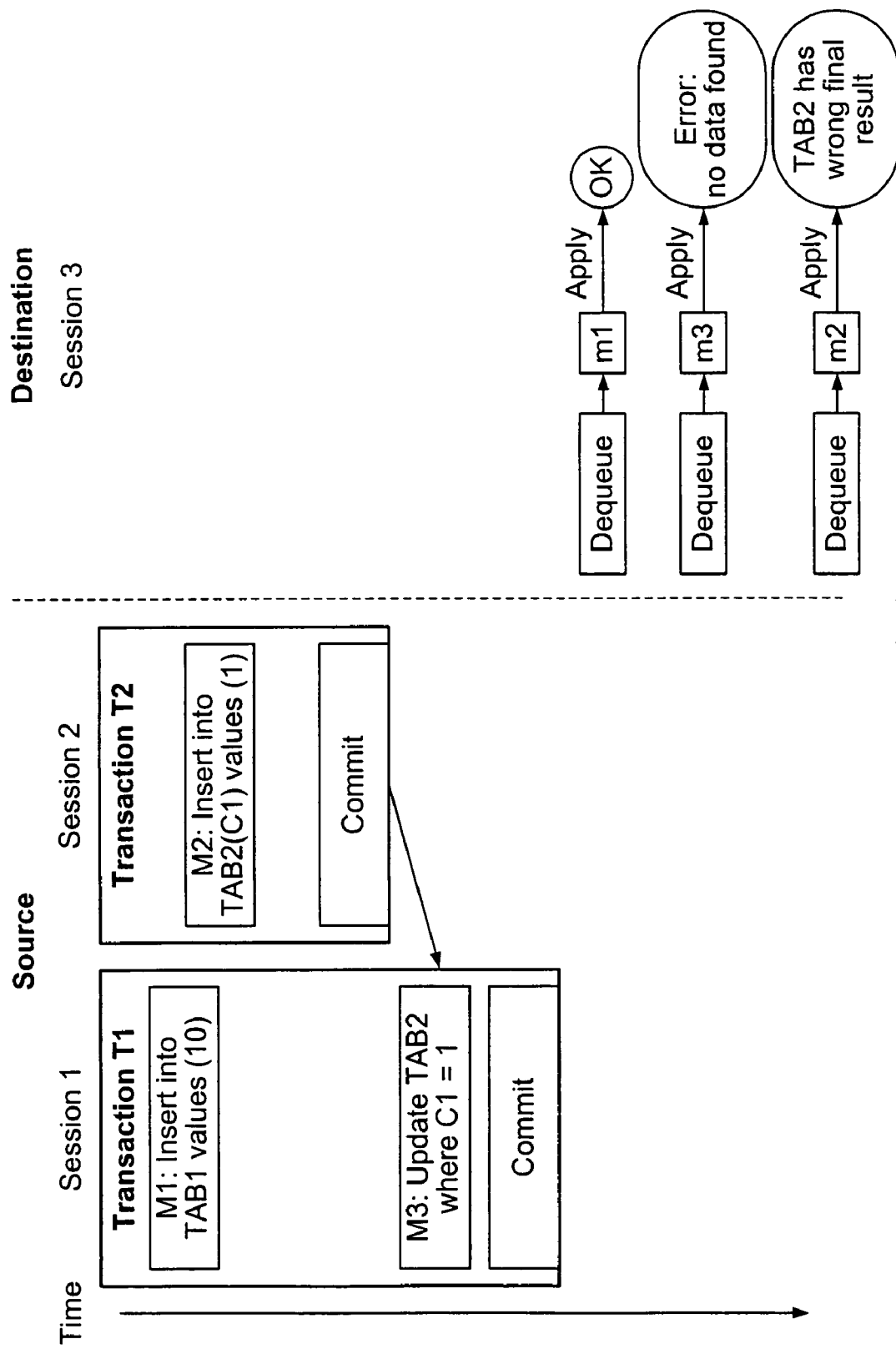
FIG. 1 is a block diagram that illustrates a data dependency violation in the context of a message queue, where messages are dequeued independent of transactional dependency ordering.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

FUNCTIONAL OVERVIEW OF EMBODIMENTS

Data consistency is required when information is shared between database components, systems, applications and users. One way to maintain data consistency is by preserving the transactional semantics of the systems and applications involved in the communication. Thus, data consistency in the context of information sharing requires maintenance of dependencies among information being shared.

According to one aspect of the invention, transactional dependency ordering is implemented in a database system message queue, by associating a unique system commit time with each transactional message group. Thus, the transactional dependency model underpinning the database system is utilized to enforce transactional dependent behavior for the queue. For example, if transaction T2 is data dependent on transaction T1 (i.e., T2 is affected by a value written by T1), then all messages associated with T1 must appear in the message queue in a dequeue order before messages associated with T2.

According to another aspect of the invention, read consistency is implemented in a database system message queue, by allowing only messages with a fully determined order to be visible. A fully determined order is implemented through use of a high watermark, which guarantees that future transactions, for which messages are entering the queue, have commit times that are greater than the current high watermark. Therefore, only messages below the current high watermark are visible and can be dequeued, with no chance of other new messages enqueuing below the current high watermark.

By contrast with an approach to a message queue for which the behavior of all subscribers is controlled or is known to be the same, the techniques described herein provide a general purpose message queue on which multiple subscribers are allowed to perform (1) arbitrary read and dequeue operations; and (2) piece-wise consumption (i.e., dequeuing) of messages associated with any particular transaction. Further, these techniques support any number of independent user-defined message queues in a system, and multiple high watermarks for any given message queue at any given time (i.e., different "consistent read" windows for various consumers).

Operating Environment

The techniques described herein are described in the general context of a database system. A database system typically comprises one or more clients that are communicatively coupled to a server that is connected to a shared database. "Server" may refer collectively to a cluster of server instances and machines on which the instances execute. Generally, a server is combination of integrated software components and an allocation of computational resources, such as memory, a node, and processes on the node for executing the integrated software components on a processor, where the combination of the software and computational resources are dedicated to providing a particular type of function on behalf of clients of the server. Among other functions of database management, a database server governs and facilitates access to a particular database, processing requests by clients to access the database.

In order for a client to interact with a database server, a session is established for the client. A session, such as a database session, is a particular connection established from a client to a server, such as a database instance. Through a session, the client can issue a series of requests (e.g., requests for commit of database transactions) to the database server.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command that is sent from a database application to a database server contains an original statement of the database command. For the database server to process the commands, the commands must conform to a database language supported by the database server. One database language supported by many database servers is known as the Structured Query Language (SQL).

Commit-time Message Queue

A commit-time queue can be used, for example, for messaging systems that require processing messages generated by transactions that have transactional dependencies. A non-limiting example is a system where messages are used to request the execution of procedures. When certain procedures are executed, a message with a procedure name and parameters is enqueued into a queue. This message may be processed locally or sent to another database to request a Remote Procedure Call (RPC) invocation. Concurrent sessions may be calling these procedures and there may be transactional dependencies among the procedures. If the messages are processed in an order that does not preserve these dependencies then the procedure invocation may generate errors or incorrect results.

Another example of a use for commit-time queues is for trigger-based capture of database changes, where row triggers are invoked to enqueue the database changes as messages into a queue. The messages can optionally be sent to another database. The messages can be used for replication, transformation, auditing, etc.

(I) Maintaining Dependencies Among Messages

Use of Commit System Change Number for Messages in Queue

A commit-time queue is a message queue that is implemented as a queue table, for which browse and dequeue ordering of messages contained in the queue table is based on an approximate "Commit System Change Number" (CSCN) for the transaction that enqueued the message. The approximate CSCN, for a transactional message, is obtained when the transaction that enqueued the message starts to commit.

In a database system, visibility of changes to data based on a transaction is controlled by a commit. Changes of a transaction T1 are not visible to other transactions until T1 is committed. The committed changes of a transaction have an associated CSCN that indicates the time the transaction is durably committed. That is, for transactions T1 with CSCN C1 and T2 with CSCN C2, if T2 is data dependent on T1, then C2>C1 is enforced. Further, when transactions with CSCN C1 have been committed, future non-distributed transactions that commit have a CSCN greater than C1. Consequently, excluding distributed transactions and queues with delay, messages become visible in the queue in CSCN order. Sorting the queue by CSCN (or approximate CSCN) for dequeue operations achieves correct data dependency.

The commit system change number (CSCN) for a message that is enqueued into a message queue is not known until the redo record for the commit of the transaction with which the message is associated is written to the database redo log. Hence, the CSCN cannot be recorded when the message is enqueued. According to one embodiment, commit-time queues use the current SCN (System Change Number) of the database when a request to commit a transaction that has enqueued messages into a commit-time queue is intercepted, as the approximate CSCN for all of the messages in the transaction. That is, the approximate CSCN is the SCN when generation of the commit records commences, not the SCN when the commit records are written to the redo log (the "true" transaction commit SCN).

According to one embodiment, the order of messages in a commit-time queue is based on the approximate CSCN of the transaction that enqueued the messages. Data dependencies are maintained in the queue by using the approximate CSCN for ordering messages in the queue, rather than the enqueue time. Consequently, the problem with dequeuing from an enqueue-time message queue (as described in reference to FIG. 1) is overcome through use of a commit-time queue as described herein.

According to one embodiment, the approximate CSCN is selected during a commit callback. When an enqueue into a commit-time queue is performed, a callback is registered for invocation when the transaction commits. Because a transaction may enqueue into multiple commit-time queues, one commit-time callback is registered for each queue table that holds a commit-time queue that was enqueued into during the transaction. The commit callback uses a share level enqueue lock on the queue for the duration of the transaction, to support repeatable reads of transactions with queue operations that have concurrent commits. This prevents dequeue processes from moving the high watermark barrier before the transaction has completed, which is described in greater detail hereafter. The current SCN is obtained after the share level enqueue is acquired and used as the CSCN, according to an embodiment of the invention.

The approximate CSCNs of transactions recorded by a commit-time queue might not reflect the actual commit order of these transactions. For example, transaction T1 and transaction T2 can commit at nearly the same time after enqueuing their messages. The approximate CSCN for T1 can be lower than the approximate CSCN for T2, but T1 can take more time to complete the commit than T2. In this scenario, the actual CSCN for transaction 2 is lower than the actual CSCN for transaction 1. However, in this scenario these transactions cannot be transactionally dependent, and the approximate CSCNs of transactionally dependent transactions always follow the original CSCN order.

Use of a Separate Table for Storing Transaction CSCNs

According to one embodiment, a table that is separate from the queue table for the message queue is used to store the approximate CSCN values for corresponding transactions. Drawbacks to storing an approximate CSCN value in each message row requires an update on N rows when a transaction group of N messages is committed, which can be a computationally expensive operation for large transactions. Further, additional actions at commit time increase the chance of a commit failure. By contrast, storing the approximate CSCN in only one row per transaction group would result in a constant update cost, but when the message containing the approximate CSCN is removed from the queue, then the approximate CSCN needs to be copied to another message in the transaction group. This increases the cost, complexity, and duration of message dequeuing because, in addition to the overhead of copying the approximate CSCN to another message, determining the approximate CSCN of a message may require a lookup of other rows in the queue table with the same enqueue identifier to find the approximate CSCN associated with the enqueue identifier.

According to one embodiment, an index-only table is used to store associations between transaction identifiers and corresponding approximate CSCN values. An index-only table is used, according to this embodiment, because index-only tables keep data sorted on a primary key and, therefore, increase the performance of applications by providing faster key-based access to data. Furthermore, index-only tables are a compact data structure, compared to traditional relational database tables on which separate indexes are built, and, therefore, provide a faster mechanism for retrieving CSCN values. Index-only tables eliminate the index to table I/O associated with more conventional index/table storage structures and storage requirements are reduced because key columns are not duplicated in the table and a corresponding index.

In one implementation, the rows from an index-only table are maintained in a B-tree index built on the primary key, where the B-tree index contains both the encoded key value and the encoded key value's corresponding row contents. In this particular scenario, the approximate CSCN values may be used as the primary key, with the corresponding row contents comprising the transaction identifiers for a respective transaction. Hence, the index-only table is maintained sorted on CSCN values.

A Method for Managing Messages in a Queue

Figure 3:
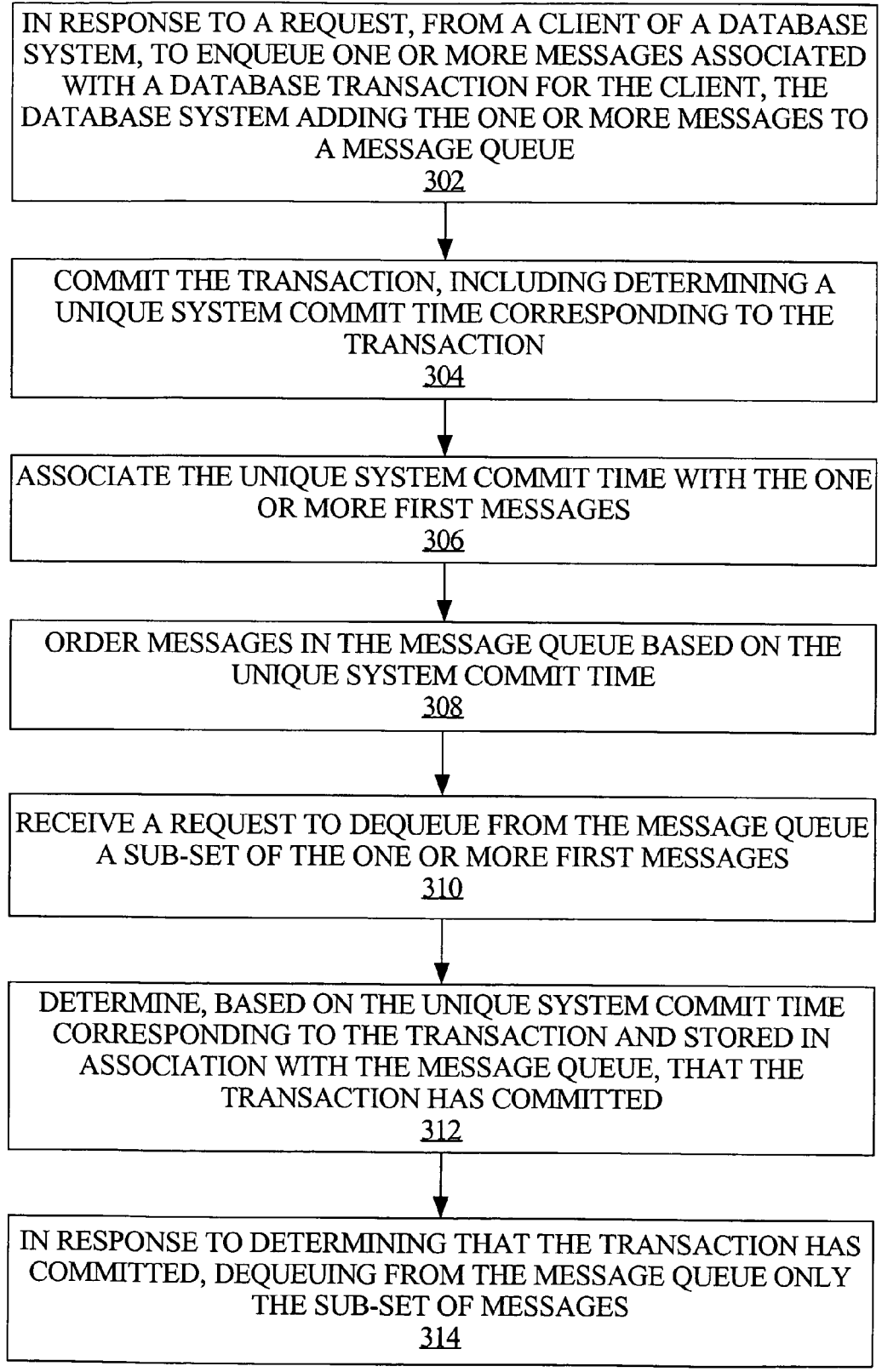
FIG. 3 is a block diagram that illustrates a process for managing messages in a queue, according to an embodiment of the invention.

FIG. 3 is a block diagram that illustrates a process for managing messages in a queue, according to an embodiment of the invention. The process illustrated in FIG. 3 illustrates an implementation of the foregoing techniques. The process illustrated in FIG. 3 is implemented for automated performance by, for example, a conventional computing system such as computer system 600 of FIG. 6.

At block 302, in response to a request to enqueue one or more first messages, the one or more messages are added to a database system message queue by the database system. Significantly, the request is from a client of the database system and the one or more messages are associated with a database transaction for the client. The message queue is a general purpose message queue, referred to herein as a commit-time queue, which supports and allows multiple subscribers to perform arbitrary read and dequeue operations on the message queue. This is in contrast to a message queue for which the behavior of all subscribers is controlled (i.e., the subscribers cannot perform arbitrary read/dequeue patterns) or the behavior of all subscribers is known to be the same (i.e., the subscribers are known to only perform certain read/dequeue patterns). The request to enqueue the messages may follow a request from the client to create the message queue. According to one embodiment, a commit-time queue is created, in part, by specifying one or more columns (e.g., commit_time, enqueue_time, priority) for use as sort keys in ascending order.

At block 304, the database transaction is committed (e.g., by a database server), which includes determining a unique system commit time corresponding to the transaction (e.g., an approximate CSCN). As discussed, a database system based on the ACID model is required to maintain transactional dependencies among database transactions and, therefore, the system commit times corresponding to respective transactions are based on transactional dependencies. In other words, the database server ensures that dependent transactions actually commit after the transactions on which they depend and, therefore, a transaction on which a dependent transaction depends always has an earlier actual CSCN (and approximate CSCN). As discussed and according to one embodiment, commit-time queues use the current SCN (System Change Number) of the database, when a transaction commit request is made, as the approximate CSCN for all of the messages in the transaction.

At block 306, the unique system commit time is associated with the one or more first messages. As discussed and according to one embodiment, a table separate from the actual queue table is used for storing associations between transactions and approximate CSCNs. However, the manner in which messages in a commit-time message queue are associated with a corresponding approximate CSCN may vary from implementation to implementation. For a non-limiting example, each message in the queue could be explicitly associated with a corresponding approximate CSCN, rather than implicitly via a corresponding transaction-CSCN association.

At block 308, messages in the commit-time queue are ordered based on the messages' respective approximate CSCNs. Consequently, transactional data dependencies are enforced for the messages residing in the commit-time message queue and data dependency violations with respect to the queue are eliminated (excluding, at times, in the context of delay queues). In one embodiment, the messages are logically ordered according to their corresponding approximate CSCNs, via the table that is separate from the queue table (e.g., an index-only table).

Blocks 310-314 of FIG. 3 are optional, and represent one advantage of an implementation of the foregoing process illustrated in blocks 302-308, i.e., an arbitrary dequeue operation.

At block 310, a request is received to dequeue, from the commit-time message queue, a sub-set of the one or more first messages that correspond to an atomic database transaction. Based on the unique system commit time corresponding to the transaction and stored in association with the message queue, it is determined that the transaction has committed, at block 312.

At block 314, in response to determining that the transaction has committed, the sub-set of messages is dequeued from the message queue. Hence, a dequeue operation performed on a general purpose commit-time message queue need not be constrained to only apply to all messages associated with a particular transaction, and need not wait for all subscribers to first read the messages being dequeued before dequeuing such messages from the queue.

(II) Guaranteeing Repeatable Read Operations

Use of High Watermark for Message Queues

Figure 2:
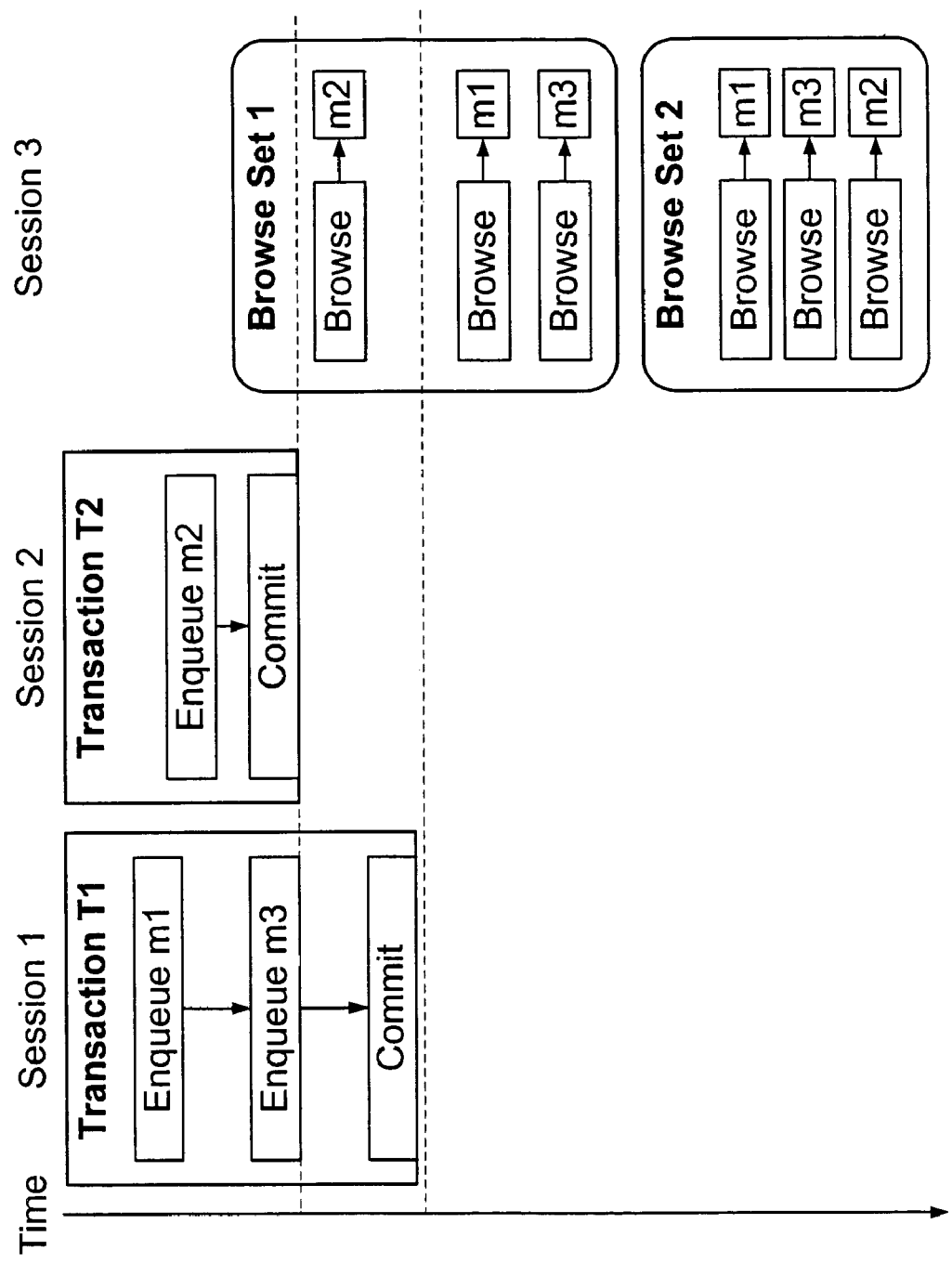
FIG. 2 is a block diagram that illustrates a non-repeatable read in the context of a message queue, where a set of browse operations performed twice without any intervening dequeues may result in two different sets of messages.

As described herein, using the approximate CSCN for ordering preserves transactional dependency ordering, but may result in re-reads of the queue giving different orders for independent messages (as described in reference to FIG. 2). This problem is overcome by using a watermark-based algorithm to control visibility of messages in the context of dequeue operations. The watermark-based algorithm prevents the visibility of messages before a deterministic ordering can be determined.

In a commit-time queue, messages in a transaction are not visible to dequeue and browse operations until a deterministic order for the messages can be established using the approximate CSCN and a high watermark. When multiple transactions are enqueuing messages concurrently into the same commit-time queue, two or more transactions can commit at nearly the same time and the commit intervals for these transactions can overlap. In this case, the messages in these transactions are not visible until all of the concurrent transactions have committed. At that time, the order of the messages can be determined using the approximate CSCN of each transaction. Hence, read consistency for browses is maintained by ensuring, via a window of time bounded by watermarks, that only messages with a fully determined order are visible.

According to one embodiment, a high watermark is chosen such that no new messages will have an approximate CSCN less than the watermark. This means that all messages below the high watermark have a static order based on their respective approximate CSCNs and, therefore, can be shown to the user.

A Method for Managing Messages in a Commit-time Queue

Figure 4:
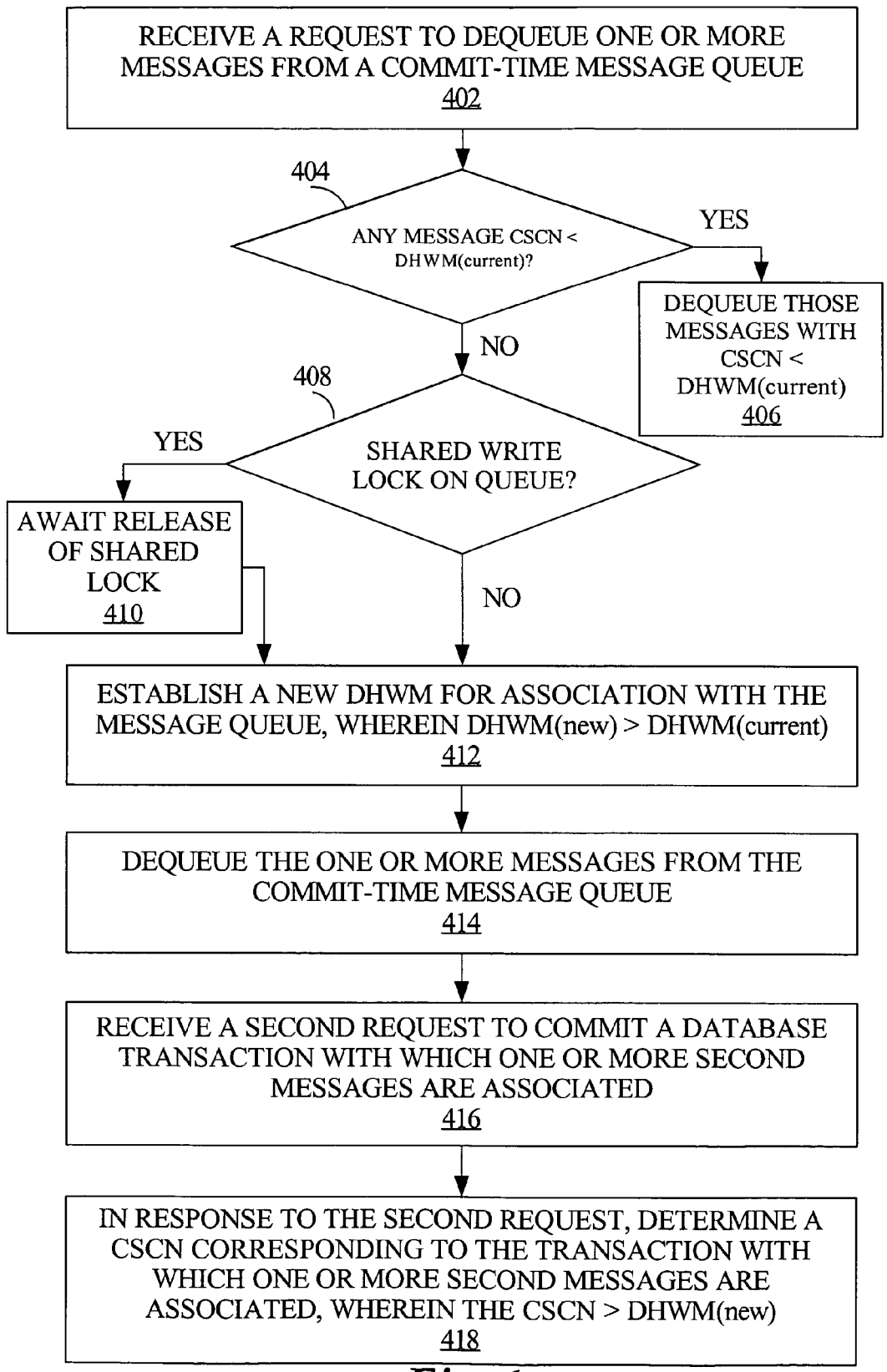
FIG. 4 is a block diagram that illustrates use of a dequeue high watermark with a commit-time message queue, according to an embodiment of the invention.

FIG. 4 is a block diagram that illustrates a process for managing messages in a commit-time message queue, according to an embodiment of the invention. The process illustrated in FIG. 4 illustrates an implementation of the foregoing techniques. The process illustrated in FIG. 4 is implemented for automated performance by, for example, a conventional computing system such as computer system 600 of FIG. 6. The process illustrated in FIG. 4 is based on prior creation and population of a commit-time queue, such as described in reference to blocks 302-308 of FIG. 3.

Figure 5:
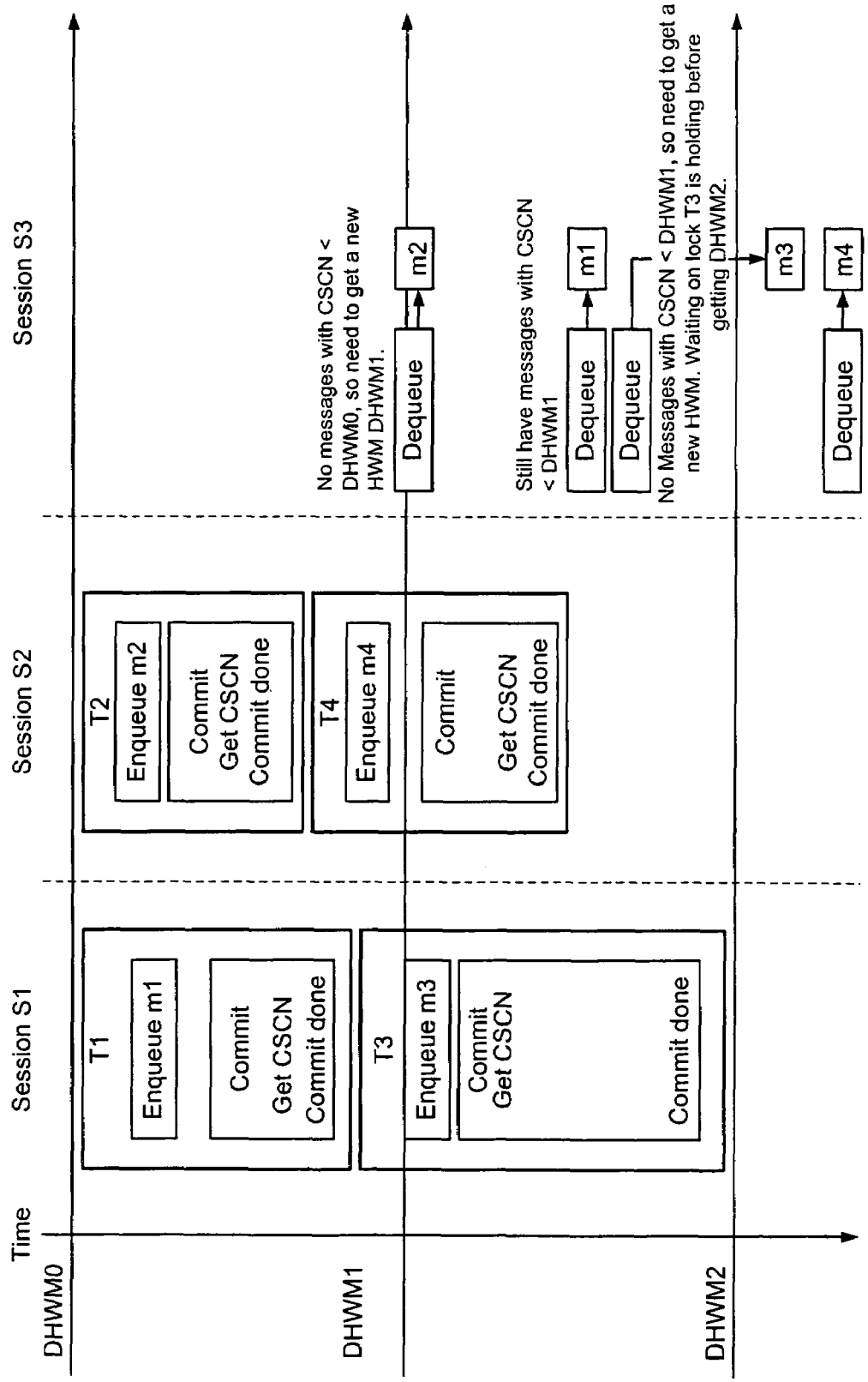
FIG. 5 is a block diagram that illustrates an example of the use of a Dequeue High Watermark (DHWM) in association with a message queue, according to an embodiment of the invention.

FIG. 5 is a block diagram that illustrates an example of the use of a Dequeue High Watermark (DHWM) in association with a message queue, according to an embodiment of the invention. In FIG. 5, Sessions S1 and S2 are concurrent sessions enqueuing messages into the same commit-time message queue. Session S3 illustrates a sequence of dequeues in which a dequeue is requested at a time when a definite order of messages in the queue cannot be determined. The example of FIG. 5 is discussed in greater detail hereafter in the context of the process of FIG. 4.

Returning to FIG. 4, at block 402, a request is received to dequeue one or more messages from the commit-time message queue. For example, a dequeue request for message m2 is received from Session S3 of FIG. 5. At the time of the dequeue request for message m2, (1) transactions T1 and T2, which are associated with messages m1 and m2, respectively, have committed, and (2) transaction T4 has begun enqueuing messages to the queue, namely, message m4, but has not committed.

At decision block 404, it is determined whether any of the one or more messages are associated with a unique system commit time (e.g., approximate CSCN) that is less than a current high watermark (Dequeue High Watermark 0, referred to as DHWM0) that is associated with the particular message queue. If the approximate CSCN for any messages in the queue is less than DHWM0, then there is no need to establish a new DHWM. Hence, the one or more messages whose approximate CSCNs are less than the current DHWM are dequeued, at block 406, because the messages are below the current high watermark (and equal to or above a current low watermark that was previously a high watermark).

If the approximate CSCN for all of the un-dequeued messages is greater than the current high watermark, DHWM0, then a new DHWM needs to be established that is above those messages' approximate CSCNs. With reference to FIG. 5, for example, at the time of the dequeue request for message m2, there are no messages in the queue that have a CSCN below DHWM0, the current high watermark. Hence, a new high watermark, DHWM1, is established at block 412. Message m2 is associated with an approximate CSCN that falls in the window between DHWM0 and DHWM1 (i.e., transaction T2 enqueued and committed at a time between watermarks DHWM0 and DHWM1), and can now be dequeued at block 414 without violating read consistency. This is because the transaction T2, with which message m2 is associated, committed below the current high watermark, DHWM1.

However, prior to generating a new high watermark at block 412, it is determined whether or not any transaction process holds a shared write lock on the message queue, at decision block 408. If a transaction process is holding a shared write lock on the queue, then that means that the transaction may still be committing messages to the queue. This is not the case with the example of FIG. 5 at this time, but is addressed again hereafter.

In reference to FIG. 5, another dequeue request is received, this time for message m1 (e.g., at block 402 of FIG. 4). Transaction T1, with which message m1 is associated, committed at a time between DHWM0 and DHWM1. Therefore, message m1 has an associated approximate CSCN that is below the current high watermark, DHWM1 (e.g., at block 404 of FIG. 4), and message m1 is dequeued (e.g., at block 406 of FIG. 4).

In reference to FIG. 5, another dequeue request is received, this time for message m3 (e.g., at block 402 of FIG. 4). At the time of the message m3 dequeue request, the current high watermark is DHWM1, and there are no remaining messages with a CSCN below DHWM1 (e.g., at block 404 of FIG. 4). This is because messages m1 and m2 are already dequeued and transaction T3, with which message m3 is associated, has begun but not completed a commit process. Hence, a new watermark is needed in order to dequeue message m3. Note also that transaction T4, with which message m4 is associated, has completed commit, but that it is not yet available for dequeue. This is because message m4 has an approximate CSCN greater than the approximate CSCN for message m3 (i.e., message m4 is ordered after message m3 in the queue based on their respective approximate CSCNs).

However, transaction T3 holds a shared write lock on the queue (e.g., at block 408 of FIG. 8). At block 410 (FIG. 4), the dequeue process awaits release of the shared lock held by transaction T3. Once transaction T3 is committed and the lock is released, then a new high watermark is established, at block 412 (FIG. 4). In the example of FIG. 5, this new high watermark is DHWM2. Once the new high watermark DHWM2 is established, messages m3 and m4 can be dequeued in that order, at block 414 (FIG. 4) because they both now have approximate CSCNs below the current high watermark DHWM2.

According to one embodiment, a new high watermark is established by obtaining an exclusive lock on the message queue, incrementing the current system change number (SCN) by an incremental amount, and releasing the exclusive lock. The current SCN plus the incremental amount is used as the new high watermark, thereby ensuring that transactions that are committing concurrently with the watermark generation process are assigned a CSCN less than the new high watermark. Note that any of multiple processes may establish a new high watermark for a given commit-time message queue, if necessary at the time of a respective dequeue operation. Further, this new high watermark may be used for dequeuing operations by other processes, if still applicable for such processes' respective dequeuing operations, i.e., if messages still exist in the queue below the high watermark at the time of such processes' respective dequeuing operations.

Generally, the function of the high watermark is to ensure read consistency for the commit-time message queue by ensuring that only messages in a particular window of time between watermarks are visible and available for dequeuing, and that such message ordering is consistent with any prior reads. In reference to FIG. 5, for example, without waiting for release of the shared lock by transaction T3 and raising the high watermark barrier to a point above the completion of transaction T3 commit (DHWM2), it would have been possible for message m4 from transaction T4 to appear in the queue before message m3 of transaction T3. This would be an incorrect result because message m3 has an earlier approximate CSCN than message m4 and should be ordered accordingly.

Returning to FIG. 4, once a new high watermark is established, messages for all subsequently committing transactions must be associated with an approximate CSCN above the new (which is now the current) high watermark. Thus, after establishing a new high watermark, a request to commit a database transaction is received at block 416. In response to the request to commit, an approximate CSCN corresponding to this transaction is determined, at block 418. This approximate CSCN is for association with the enqueued messages corresponding to this transaction, where the approximate CSCN is greater than the new high watermark.

Implementation of commit-time queues, as described herein, adds functionality to general purpose message queues that cannot be readily implemented using existing technologies. The ordering semantics are more inline with database transactional behavior than enqueue-time and priority based ordering. Hence, some database queuing applications are made feasible or much easier to develop, such as concurrent explicit capture of messages into an information sharing system queue as described in referenced U.S. Pat. No. 6,889,231 entitled "ASYNCHRONOUS INFORMATION SHARING SYSTEM."

Hardware Overview

Figure 6:
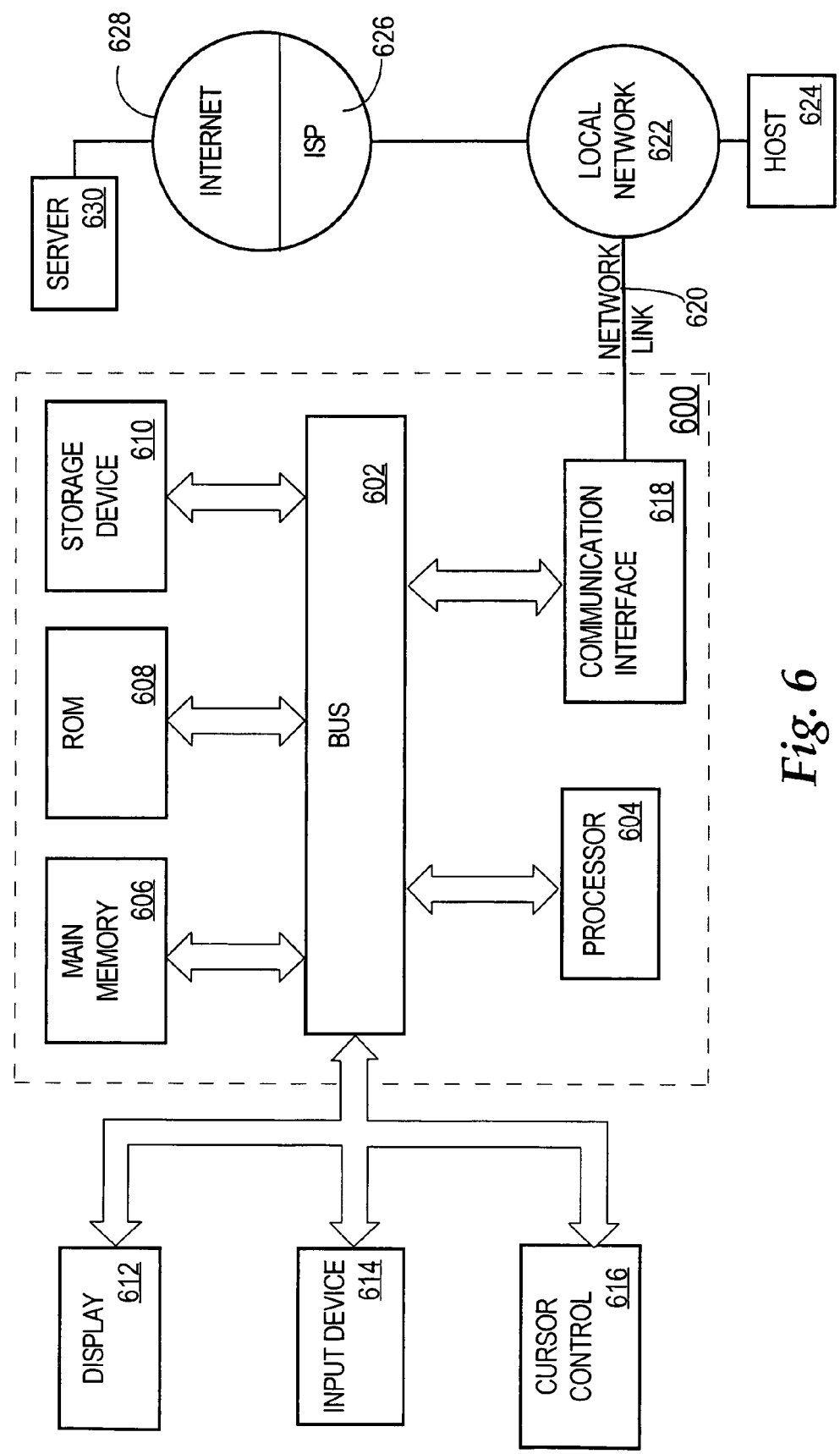
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
    in response to a request, from a client of a database system, to enqueue one or more first messages, the database system adding said one or more first messages to a message queue, said one or more first messages associated with a first database transaction being executed for said client,
        after adding said one or more first messages to the message queue:
            committing the first database transaction; and
            determining a unique system commit time corresponding to the first database transaction, wherein system commit times corresponding to respective database transactions are based on transactional dependencies among database transactions;
        after determining a unique system commit time:
            associating the unique system commit time with the one or more first messages; and
    ordering messages in the message queue based on the unique system commit time;
    in response to a request to dequeue one or more messages from the message queue,
        determining whether any message of the one or more messages is associated with a system commit time that is less than a first high watermark that is associated with the message queue; and
        if there are no messages, of the one or more messages, that are associated with a system commit time that is less than the first high watermark, then generating a second high watermark for association with the message queue, wherein the second high watermark is greater than the first high watermark,
    wherein the method steps are performed by one or more computing devices.

2. The computer-implemented method of claim 1, further comprising:
    after generating the second high watermark, receiving a second request to commit a database transaction with which one or more second messages are associated;
    in response to the second request, determining a unique system commit time corresponding to the database transaction with which the one or more second messages are associated;
    wherein the unique system commit time corresponding to the database transaction with which the one or more second messages are associated must be greater than the second high watermark.

3. The computer-implemented method of claim 1, further comprising:
    if, at the time of the request to dequeue one or more messages from the message queue, a database transaction holds a shared write lock on the message queue, then
        the step of generating the second high watermark includes awaiting release of the shared write lock before generating the second high watermark.

4. The computer-implemented method of claim 1, wherein the database system message queue is a first message queue and the unique system commit time is a first unique system commit time, and further comprising:

in response to a request, from a client of a database system, to enqueue one or more second messages, the database system adding said one or more second messages to a second message queue that is a different queue than the first message queue, said one or more second messages associated with a second database transaction being executed for said client that requested enqueue of the one or more messages, committing the second database transaction;

wherein committing the second database transaction includes determining a second unique system commit time corresponding to the second database transaction;

associating the second unique system commit time with the one or more second messages;

ordering messages in the second message queue based on the second unique system commit time; and in response to a request to dequeue one or more messages from the second message queue, determining whether any message of the one or more messages from the second message queue is associated with a system commit time that is less than a high watermark that is associated with the second message queue but not the first message queue.

5. The computer-implemented method of claim 4, wherein the request to enqueue the one or more first messages is from the same client as the request to enqueue the one or more second messages.

6. The computer-implemented method of claim 4, wherein the request to enqueue the one or more first messages is from a different client than the request to enqueue the one or more second messages.

7. The computer-implemented method of claim 1, wherein associating the unique system commit time with the one or more first messages includes the step of:

storing, in a database table separate from the message queue, records that include an identifier of the database transaction in association with the unique system commit time.

8. The computer-implemented method of claim 7, wherein the database table is an index-only table.

9. The computer-implemented method of claim 7, wherein the step of ordering messages in the message queue comprises ordering the records in the database table that is separate from the message queue.

10. The computer-implemented method of claim 1, wherein ordering messages in the message queue includes the step of:

ordering messages in the message queue based on their respective commit times as a primary ordering element and priority as a secondary ordering element.

11. The computer-implemented method of claim 1, further comprising:

receiving a request to dequeue from the message queue a sub-set of the one or more first messages;

determining, based on the unique system commit time corresponding to the database transaction and stored in association with the message queue, that the database transaction has committed; and in response to determining that the database transaction has committed, dequeuing from the message queue only the sub-set of the one or more first messages.

12. The computer-implemented method of claim 1, wherein the first database transaction is a database transaction on which a second database transaction depends, and further comprising the steps of:

before receiving the one or more first messages, receiving at the message queue one or more second messages associated with the second database transaction;

before the first transaction is committed, receiving a request to commit the second database transaction, and receiving a request to dequeue from the message queue a particular second message;

determining that the particular second message is not associated with a unique system commit time; and in response to determining that the particular second message is not associated with a unique system commit time, refusing to dequeue the particular second message.

13. A computer-readable storage medium containing instructions, wherein the instructions are instructions which when executed, cause one or more computing devices to perform the method of claim 1.

14. A computer-readable storage medium containing instructions, wherein the instructions are instructions which when executed, cause one or more computing devices to perform the method of claim 2.

15. A computer-readable storage medium containing instructions, wherein the instructions are instructions which when executed, cause one or more computing devices to perform the method of claim 3.

16. A computer-readable storage medium containing instructions, wherein the instructions are instructions which when executed, cause one or more computing devices to perform the method of claim 4.

17. A computer-readable storage medium containing instructions, wherein the instructions are instructions which when executed, cause one or more computing devices to perform the method of claim 5.

18. A computer-readable storage medium containing instructions, wherein the instructions are instructions which when executed, cause one or more computing devices to perform the method of claim 6.

19. A computer-readable storage medium containing instructions, wherein the instructions are instructions which when executed, cause one or more computing devices to perform the method of claim 7.

20. A computer-readable storage medium containing instructions, wherein the instructions are instructions which when executed, cause one or more computing devices to perform the method of claim 8.

21. A computer-readable storage medium containing instructions, wherein the instructions are instructions which when executed, cause one or more computing devices to perform the method of claim 9.

22. A computer-readable storage medium containing instructions, wherein the instructions are instructions which when executed, cause one or more computing devices to perform the method of claim 10.

23. A computer-readable storage medium containing instructions, wherein the instructions are instructions which when executed, cause one or more computing devices to perform the method of claim 11.

24. A computer-readable storage medium containing instructions, wherein the instructions are instructions which when executed, cause one or more computing devices to perform the method of claim 12.

* * * * *

UNITED STATES PATENT AND TRADEMARK OFFICE
CERTIFICATE OF CORRECTION

| | | |
|---|---|---|
| PATENT NO. | : 7,680,793 B2 | Page 1 of 1 |
| APPLICATION NO. | : 11/245863 | |
| DATED | : March 16, 2010 | |
| INVENTOR(S) | : Lik Wong et al. | |

It is certified that error appears in the above-identified patent and that said Letters Patent is hereby corrected as shown below:

In column 1, line 22, delete "1006," and insert -- 2006, --, therefor.

In column 13, line 60, after "and/or" insert -- stored in storage device 610, or other non-volatile storage for later execution. In this manner, --.

Signed and Sealed this

Sixteenth Day of November, 2010

David J. Kappos
*Director of the United States Patent and Trademark Office*